Dec. 25, 1934.  N. SCHACHTER  1,985,382
FAUCET
Filed Nov. 11, 1932
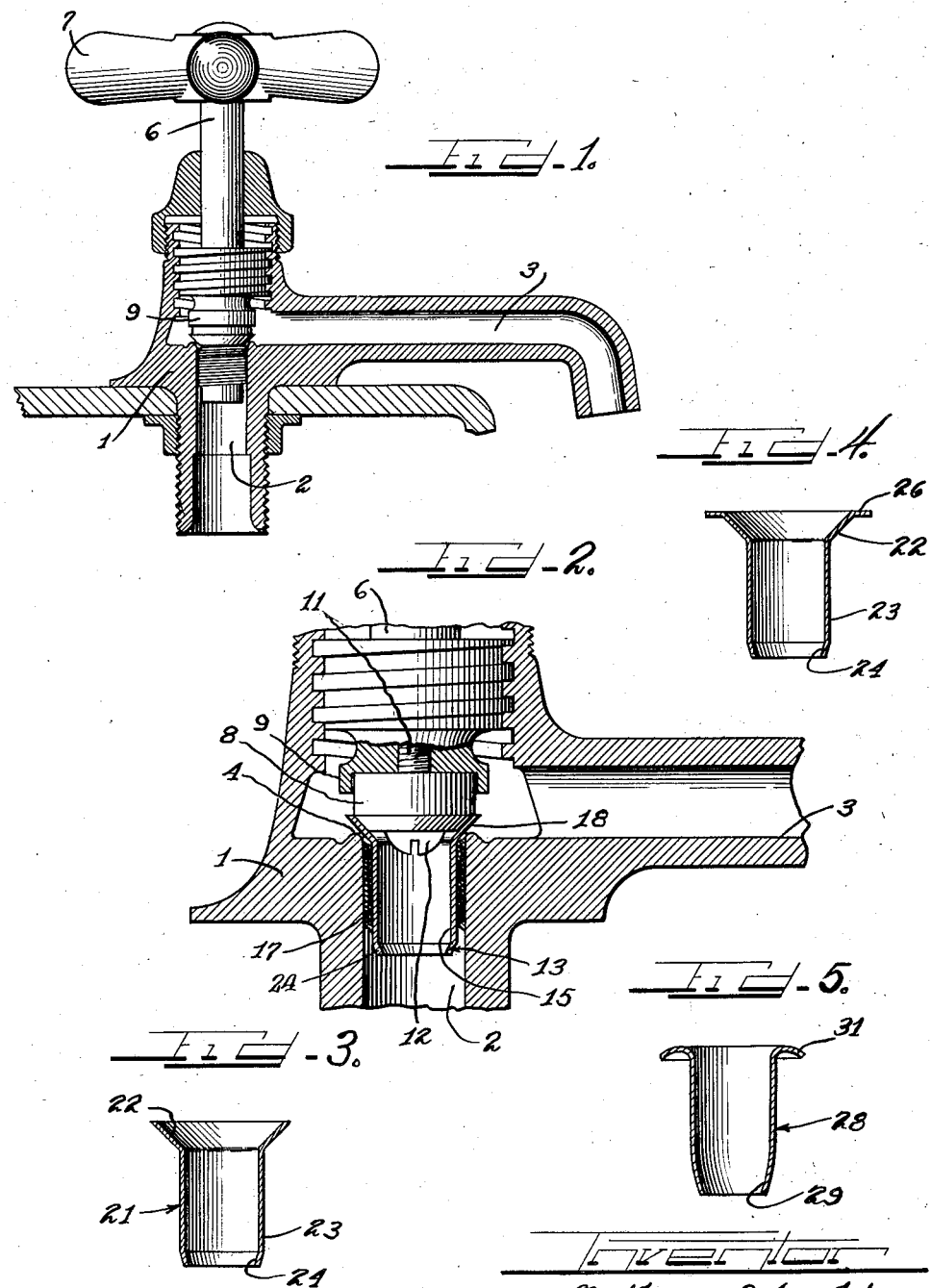

Patented Dec. 25, 1934

1,985,382

UNITED STATES PATENT OFFICE 1,985,382

FAUCET

Nathan Schachter, Chicago, Ill.

Application November 11, 1932, Serial No. 642,164

3 Claims. (Cl. 251—167)

This invention relates to faucets and will be described as incorporated in a faucet including an auxiliary replaceable valve seat.

An object of this invention is the provision of a faucet having combined and cooperatively associated therewith, a replaceable valve seat so formed and disposed with relation to the faucet body that a yielding contact with the valve is afforded.

Another object is the provision of a flexible valve seat device which is very simple of construction, and economical to use, said device requiring no milling or grinding and no skilled labor or special tools for the installation of the same.

A further object is the provision of such a device which when assembled provides a seat presenting a yielding resistance to the closing of the valve, also one which is mounted to have a limited freedom of movement in all directions and which will rotate upon application of the valve, to prevent scoring of the surface engaged by the valve as the valve is closed.

Other objects and advantages of this invention will become apparent from the following detailed description with reference to the accompanying drawing.

On the drawing:

Figure 1 is a vertical section through a faucet incorporating my invention, some of the parts being shown in elevation.

Figure 2 is an enlarged fragmentary section of a portion of that shown in Figure 1 and illustrating the replaceable valve seat in section, and Figures 3, 4 and 5 are vertical sections through modified forms of replaceable valve seats, incorporating the principle of this invention.

As shown on the drawing:

The faucet as illustrated in Figures 1 and 2 comprises a body 1 having formed therein an inlet passageway 2 and a discharge passageway 3. Adjacent the inner end of the inlet passageway 2, there is provided an annular shoulder 4 disposed about the passageway and formed integrally with the body 1. A valve stem 6, having thereon a handwheel 7, is provided for rotatably and vertically moving the valve 8 through the medium of the valve body portion 9 from the lower end of the stem 6. The valve 8 is preferably secured to the valve body 9 by a suitable screw 11, the head 12 of which extends downwardly into the upper end of the passageway 2 and into the replaceable valve seat 13 disposed in the passageway.

The replaceable valve seat 13, is provided with a relatively long shank portion 15 which is substantially smaller in diameter than the passageway 2 such that when disposed therein in the manner shown in Figure 2, it will reduce the capacity of the passageway 2 and result in a reduction of liquid flow through the passage. Disposed about the seat 13, between the seat 13 and the inner surface of the passageway 2, is a packing 17 preferably consisting of thread, twine, or similar material, preferably impregnated or coated with suitable liquid resisting material, such for example as pitch, tar, or soap to prevent the leakage of fluid through the packing 17. When installing the replaceable seat element 13, the packing material 17 is first wound around the seat element, and the shank is forcibly pressed into the passageway 2 until the flange portion 18 engages the annular shoulder 4. The frictional contact of the packing 17 with the shank 15 and with the inner surface of the passageway 2 is sufficient to hold the seat substantially in position. However, when the valve 8 is lifted from the valve seat, the seat will be lifted a slight amount so as to clear the shoulder 4, as a result of the resiliency of the packing 17. This arrangement affords a limited universality of movement for the valve seat upon application, or closing of the valve 8 upon the flared portion 18 of the seat. This avoids the necessity of having the valve seat perfectly fitted in position and avoids the necessity of the valve seat being ground to fit the valve. The valve seat is preferably formed of relatively soft metal such as copper and is of a thickness which will yield sufficiently to form a perfect fit with the valve. Also upon application or closing of the valve 8, the valve seat will rotate within the passageway 2, thus avoiding the possibility of scoring of the valve seat by the frictional action of the valve element thereon.

In the modification shown in Figure 3, the valve seat 21 has a flared upper end 22 and an elongated shank 23, the lower end of which is tapered inwardly as indicated at 24 to further restrict the passageway 2 and limit the amount of liquid that will flow through the passage with a given pressure in the passageway 2.

In the modification shown in Figure 4, there is provided an additional radially extending flange 26. This flange is particularly suitable for use with a wide, flat valve which will not fit within the flanged portion 22. In Figure 5 is shown another form of the invention also suitable for use with a flat valve. This valve seat designated generally by numeral 28 includes an inwardly tapered portion 29 forming a restricted opening in the lower end. The upper end is flared outwardly and downwardly into a flange 31 adapted to extend over the shoulder 4, when inserted in the passageway 2 of the passage.

In the use of a replaceable valve seat of this type, it is preferable to employ such sizes in faucets as will substantially equalize the flow of water, whether the faucet be employed at a low point or at a high point in the water system, thus assuring an adequate supply of water at all points.

From the foregoing description, it will be understood by those skilled in the art that my invention as herein illustrated and described may be modified, without departing from the principle of the invention, and I desire that the patent to be granted hereon shall not be limited in any manner except as required by the prior art.

I claim as my invention:

1. In a faucet in combination, a body having a fluid entrance passageway, said body including an integrally formed annular shoulder disposed about the inner end of the fluid passageway, a replaceable valve seat in said body, said valve seat being tubular and including a relatively long shank portion extending longitudinally within the passageway, an outwardly flared upper end extending over said shoulder and disposed for engagement by a valve, an inwardly projecting flange on the lower end of the shank, and resilient packing means so disposed around the shank of the seat to hold the same free from contact with the inner surface of the fluid passageway as to permit limited universal movement of the valve seat relative to the body.

2. A faucet including, in combination, a body having a fluid passageway therein, a valve seat element partially disposed within the passageway and having oppositely directed flanges formed on the opposite ends thereof, and a resilient packing means engaged around the valve seat element intermediate the ends thereof to hold said valve seat element spaced at all points from the body to permit limited universal movement of the valve seat element.

3. A faucet including, in combination, a body having a fluid passageway therein, a valve in said body, a valve seat element partially disposed within the passageway, said valve seat element having one end thereof flared outwardly to receive the valve and the opposite end deflected inwardly, and a resilient packing means in the passageway and engaged around an intermediate portion of the valve seat element to hold all points thereof spaced from the body to permit limited universal movement of the valve seat element.

NATHAN SCHACHTER.